United States Patent [19]

Gardiner

[11] 4,046,926

[45] Sept. 6, 1977

[54] NON-DAIRY CREAMER COMPOSITIONS

[75] Inventor: David Stirling Gardiner, Cornhill-on-Tweed, England

[73] Assignee: General Foods Ltd., Banbury, England

[21] Appl. No.: 710,065

[22] Filed: July 30, 1976

[51] Int. Cl.$^2$ ............................................. A23D 5/00
[52] U.S. Cl. ................................. 426/613; 426/585; 426/657; 426/658
[58] Field of Search .................. 426/98, 99, 250, 539, 426/570, 572, 580, 585, 613, 657, 658, 656

[56] References Cited

U.S. PATENT DOCUMENTS

| 3,592,940 | 7/1971 | Quesada | 426/98 X |
| 3,706,572 | 12/1972 | Einstman et al. | 426/98 X |
| 3,764,711 | 10/1973 | Melnychyn et al. | 426/656 |
| 3,935,325 | 1/1976 | Gilmore et al. | 426/613 |

*Primary Examiner*—Raymond N. Jones
*Assistant Examiner*—R. A. Yoncoskie
*Attorney, Agent, or Firm*—Howard J. Newby; Thomas V. Sullivan; Mitchell D. Bittman

[57] ABSTRACT

This invention relates to non-dairy creamer compositions and, in particular, to non-dairy creamers based on sodium caseinate and having improved resistance to feathering.

8 Claims, No Drawings

NON-DAIRY CREAMER COMPOSITIONS

BACKGROUND OF THE INVENTION

Non-dairy creamers normally contain fat (20–40% by weight), protein (either skim milk solids, more usually sodium caseinate, about 10%), and carbohydrate (e.g., corn syrup solids). The ingredients are normally formulated as an emulsion which is subsequently dried, preferably spray-dried, and sold in the form of a powder. This invention more particularly refers to dried non-dairy creamers.

This invention is further concerned with the incorporation of sodium carbonate/dipotassium hydrogen phosphate mixtures in the formulation of non-dairy creamers, based on sodium caseinate, when such creamers are added to coffee brews (i.e., from roast and ground coffee, or soluble coffee).

"Feathering" is a term commonly used to describe what is essentially the precipitation from solution of the serum protein, of a milk or cream (or similar artificially prepared product), in the presence of an unfavourable acid-salt environment. Such as environment may be present in coffee brews (either of roast and ground coffee, or of instant coffees), which may be rather acid (i.e., low pH or high acidity titration), and which if also, made up with hard water (particularly soluble coffees), contain a high proportion of calcium and magnesium ions. Feathering gives an undesirable appearance to a cup of coffee with added creamer and is a somewhat similar phenomenon to milk curdling, when the milk is sour.

It is known to use certain inorganic salts in non-dairy creamer formulations to provide feathering resistance against possible unfavourable hot coffee brews, e.g., in the use of acid coffee and local hard water. This use is described by knightley [Food Technology, Vol. 23 (1960) pg. 37]. Dipotassium hydrogen phosphate has also been proposed, as in Canadian Pat. No. 688,859; and the use of other salts has been described, such as sodium aluminium phosphate, polyphosphates and citrates (United States Patent No. 3,706,572). The precise mode of action is not clear in such a complex system; indeed there could be some differences in stabilizing skim milk protein, compared with sodium caseinate, though the latter in general should be more resistant to feathering.

The factors which are believed to influence feathering resistance are:

1. The buffering effect of salt against pH reduction by the addition of acid from an external source; or a straight neutralization of acid present.

It is known that the isolelectric point of casein, that is the pH at which colloidal solubility is least, is 4.6, whilst precipitation will actually start to occur at a pH rather higher, i.e., about 5.3. Casein particles are a stable complex of calcium — casein — phosphate, and acid will change this composition.

A similar situation exists with the colloidal caseinate anions of sodium caseinate, though the effect of a small amount of acidity is less marked.

2. Stabilizing the effect of phosphates.

The stability of casein colloid is dependent upon a correct salt balance; thus, an excess of calcium ions can remove phosphate from the casein. This salt balance is further dependent upon pH and temperature; hence the effect of heat in destabilizing casein particles, and use of phosphates and citrates before evaporating milk.

The situation is less clear with sodium caseinate, but it is known that calcium and magnesium caseinate are water-insoluble. The addition of phosphate ions may have a simple sequestering effect by the reactions:

$$2K_2HPO_4 + 3Ca^{++} \rightarrow Ca_3(PO_4)_2 + 4K^+ + 2H^+$$

similarly for other phosphates and also citrates.

Caseinate ions additionally may be stabilized by the absorption of phosphate ions.

The problem of featuring is particularly marked where low pH coffees are used, (for example, a pH of 4.5 to 5.0), and especially where hard water is used for make up of the coffee (say 400 ppm or more, expressed as ppm. Ca $CO_3$). A non-dairy creamer in solution will have a pH of about 6.4, which on addition to such a coffee, without added salts, will have a pH of about 5.1. Typically, a teaspoonful of dried non-dairy creamer will be added to a cup of hot coffee. The weight of the creamer used will be about 3.0 grams of a desirable lightening or creaming effect, though in practice may range from 2 to 3.5 grams. For the purposes of quantifying the effect of feathering resistance, it is convenient to test at 2.3 grams of creamer added to a coffee brew at a concentration of 1.5 grams in 150 ml. water at a temperature of 80° C.

It is an object of the present invention to provide a non-dairy creamer composition having enhanced feathering resistance even when used to make up coffee beverages from water with say 500 ppm or more hardness. While this may be done by formulating the creamer with a sufficiently high level of dipotassium hydrogen phosphate alone, the taste of the phosphate can become unacceptable. For example, when this phosphate is introduced into a 1% w/w coffee solubles solution, at about 460 ppm, and at a rather higher level of about 530 ppm in a more typical 1.2% coffee solution.

SUMMARY OF THE INVENTION

Surprisingly, we have now found that by employing a mixture of sodium carbonate and dipotassium hydrogen phosphate, feathering resistance for creamers based on sodium caseinate is attainable at very high hardness level of water in the make up, but without the disadvantages that can accrue to the use of either substance alone. For instance, sodium carbonate alone also could be used at a sufficiently high level, but again beyond about 200 ppm. in an unacceptable amount for reasons of flavour and potential discolouring effect.

The use of sodium carbonate has not however been generally mentioned in connection with feathering resistance, at least with sodium caseinate compositions. Again, sodium carbonate may have a buffering/neutralizing action against added acid; or it may be considered also to have a sequestering action against Ca ++ and Mg ++ ions, by precipitation as carbonate.

We have also found that greatest resistance to feathering with a given proportion of sodium carbonate and dipotassium hydrogen phosphate is secured by spray-drying the emulsion of the creamer with the salts dissolved therein before drying, compared with dry-mixing in after spray-drying the emulsion. Spray-drying a warm emulsion with added sodium carbonate in excess (about 0.5% by weight dry basis and above) however causes the development of browning reactions which is again highly undesirable.

DETAILED DESCRIPTION OF THE INVENTION

In accordance with the present invention there is provided a process for the preparation of a non-dairy creamer powder composition having enhanced feathering resistance which comprises forming an emulsion and drying, normally spray-drying, from 20 to 40% by weight on a dry basis of fat, from 3 to 15% by weight of sodium caseinate, from 35 to 65% by weight carbohydrate, together, if desired, with an emulsifier, such as a monoglyceride, preferably in the range of from 0.5 to 3.0% by weight, and importantly including as a buffering agent a mixture of sodium carbonate and a phosphate, preferably dipotassium hydrogen phosphate, or a citrate, at a level from 1 to 4% by weight.

The invention also provides a non-dairy creamer powder formed by spray-drying an emulsion as described above.

The amount of the buffer mixture to be used depends upon the expected or recommended consumer dose level to attain a feathering resistance of 500 ppm or more. The proportion of carbonate/phosphate, and the percentage amount of the buffer mixture, should be such that neither a backtaste from the phosphate or carbonate, nor any tendency to browning from the sodium carbonate occurs.

Preferably, the buffering agent is a mixture of sodium carbonate and dipotassium hydrogen phosphate in a weight ratio of 1:9. Thus, a high-feathering resistance composition is provided by a mixture of 2.7% by weight dipotassium hydrogen phosphate and 0.3% by weight sodium carbonate as the buffering agent, which gives a feathering resistance against at least 500 ppm hardness and a coffee pH of 4.75 at the test amounts stated above. This composition will have no backtaste, nor any tendency to cause browning reactions since the phosphate and carbonate levels are both sufficiently low, up to the normal usage level of the creamer.

The following Table illustrates the results of tests carried out with spray-dried compositions containing dipotassium hydrogen phosphate or sodium carbonate alone compared with a mixture of these salts according to the invention. The feathering resistance is determined with the test level amounts of coffee and creamer. The taste was assessed at this same level, and at the normal usage.

| $K_2HPO_4$ | $Na_2CO_3$ | Feathering resistance | Taste Characteristics |
|---|---|---|---|
| 2.0% | — | Feather at 300 ppm | No backtastes |
| 2.2 | — | at 350 ppm | No backtaste |
| 3.0% | — | at 500 ppm | Slight backtaste |
| 2.7 | 0.3 | at 550 ppm | No backtaste |
| — | 1.0 | at 400 ppm | Backtaste |

The above Table indicates, that a mixture of salts according to the invention achieves high feathering resistance with sodium caseinate based creamers when the salts are incorporated in the emulsion before spray-drying.

Similar favourable results may be achieved with other mixtures with sodium carbonate, i.e., citrates and other phosphates.

The following Example illustrates the invention and the manner in which it may be performed.

EXAMPLE

A coffee creamer emulsion was prepared at the following dry weight percentages of ingredients:
60.0% Corn Syrup Solids; 32.0% high lauric vegetable fat; 3.5% sodium caseinate; 1.5% mono/diglyceride emulsifier (Cremodon 250/20); 2.7% dipotassium hydrogen phosphate and 0.3% sodium carbonate.

400 lbs. of this emulsion were prepared, by first dissolving the corn syrup solids and sodium caseinate in 200 lbs. warm water at 50° C., followed by dissolution of the buffer salts. A melted fat phase was prepared at the same time from the remaining fatty ingredients and kept at a temperature no higher than 50° C. The melted fat phase was then poured into the aqueous phase with agitation to cause emulsification, at a temperature no higher than 50° C. The resultant emulsion was then homogenized under a pressure of 4000 p.s.ig, and passed to a spray drier of conventional design with centrifugal pressure nozzles, and dried to a powder of 2% moisture content. An inlet temperature of 400° F. and an outlet temperature of 200° F. was employed, to give somewhat less than 200 lbs. dried product.

The spray-dried coffee creamer, when added at the rate of 3.0 grams to a cup of instant coffee, made up from 2.0 grams instant coffee dissolved in 170 mls. of water at 80° C., of known hardness, that is 550 ppm. No feathering occurred, nor was there any backtaste attributable to the presence of the phosphate/carbonate agent, nor had any discoloration occurred in the powder as a result of browning reactions.

What is claimed is:

1. A process for the preparation of a non-dairy creamer powder composition having enhanced feathering resistance which comprises forming an emulsion comprising from 20 to 40% by weight on a dry basis of fat, from 3 to 15% by weight of sodium caseinate, from 35 to 65% by weight of carbohydrate and including as a buffering agent a mixture of effective amounts of sodium carbonate and a phosphate or a citrate at a level from 1 to 4% by weight and drying said emulsion.

2. A process according to claim 1, in which the emulsion also contains an emulsifier.

3. A process according to claim 2, in which the emulsifier is present in amount within the range of from 0.5 to 3.0% by weight.

4. A process according to claim 2, in which the emulsifier is a monoglyceride.

5. A process according to claim 1, in which the sodium carbonate and dipotassium hydrogen phosphate are present in a weight ratio of 1:9.

6. A process according to claim 1, in which the drying step is spray-drying.

7. A non-dairy creamer powder formed by spray-drying an emulsion comprising from 20 to 40% by weight on a dry basis of fat, from 3 to 15% by weight of sodium caseinate, from 35 to 65% by weight carbohydrate, from 0.5 to 3.0% by weight of a monoglyceride emulsifier and from 1 to 4% by weight of a buffering agent comprising a mixture of effective amounts of sodium carbonate and a phosphate or citrate.

8. A powder according to claim 7, in which the buffering agent is a mixture of 0.3% by weight of sodium carbonate and 2.7% by weight of dipotassium hydrogen phosphate.

* * * * *